United States Patent

Bonacini

(10) Patent No.: US 9,114,675 B2
(45) Date of Patent: *Aug. 25, 2015

(54) BEAD BREAKING UNIT FOR TYRE CHANGING MACHINES

(75) Inventor: Maurizio Bonacini, Correggio (IT)

(73) Assignee: GIULIANO GROUP S.P.A., Correggio (RE) (IT)

( * ) Notice: Subject to any disclaimer, the term of this patent is extended or adjusted under 35 U.S.C. 154(b) by 610 days.

This patent is subject to a terminal disclaimer.

(21) Appl. No.: 13/438,869

(22) Filed: Apr. 4, 2012

(65) Prior Publication Data

US 2012/0291960 A1 Nov. 22, 2012

(30) Foreign Application Priority Data

May 20, 2011 (IT) .............................. MO2011A0118

(51) Int. Cl.
*B60C 25/132* (2006.01)
*B60C 25/13* (2006.01)
*B60C 25/02* (2006.01)
*B60C 25/04* (2006.01)
*B60C 25/138* (2006.01)

(52) U.S. Cl.
CPC ................. *B60C 25/13* (2013.01); *B60C 25/02* (2013.01); *B60C 25/025* (2013.01); *B60C 25/132* (2013.01); *B60C 25/04* (2013.01); *B60C 25/138* (2013.01)

(58) Field of Classification Search
CPC .... B60C 25/02; B60C 25/025; B60C 25/132; B60C 25/138; B60C 25/04
USPC ................................................ 157/1.17, 1.24
See application file for complete search history.

(56) References Cited

U.S. PATENT DOCUMENTS

| 5,215,138 A | 6/1993 | Toriselli et al. |
| 5,381,843 A | 1/1995 | Corghi |
| 7,100,660 B2 | 9/2006 | Corghi |
| 7,500,504 B2 * | 3/2009 | Bonacini ...................... 157/1.17 |

(Continued)

FOREIGN PATENT DOCUMENTS

| EP | 0 512 595 | 11/1992 |
| EP | 0 557 618 | 9/1993 |

(Continued)

OTHER PUBLICATIONS

Italian Search Report dated Dec. 12, 2011, corresponding to the Foreign Priority Application No. MO20110118.

*Primary Examiner* — Monica Carter
*Assistant Examiner* — Danny Hong
(74) *Attorney, Agent, or Firm* — Young & Thompson

(57) ABSTRACT

The bead breaking unit (1) for tire changing machines (A) includes one arm (2) associated rotatable with a supporting structure (3), a bead breaking tool (4) associated with the arm (2) and a movement apparatus (5) associated with the arm (2) and suitable for moving the arm (2) from a disengagement position, wherein the bead breaking tool (4) is substantially moved away from the tire (B) of a wheel (D) to undergo bead breaking, to an operating position, wherein the bead breaking tool (4) is engaged on the tire (B). The arm (2) includes an adjustment apparatus (9) for adjusting the position of the bead breaking tool (4) along a near/away direction to/from the wheel (D), suitable for adjusting the position of the bead breaking tool (4) when the arm (2) is in the disengagement position, depending on the sizes and/or type of the wheel (D).

18 Claims, 14 Drawing Sheets

(56) References Cited

U.S. PATENT DOCUMENTS 7,591,295 B2 * 9/2009 Bonacini ............... 157/1.17
8,408,273 B2 * 4/2013 Bonacini ............... 157/1.17

FOREIGN PATENT DOCUMENTS

| EP | 1 524 134 | 4/2005 |
| EP | 1 897 707 | 3/2008 |

* cited by examiner

BEAD BREAKING UNIT FOR TYRE CHANGING MACHINES

The present invention relates to a bead breaking unit for tyre changing machines.

Tyre changing machines are commonly used for fitting/removing vehicle wheel tyres to/from respective rims.

As is known, before being able to completely remove a tyre from its housing on the respective rim, it is necessary to detach the beads thereof from the bead retention edges on the rim itself.

This operation is performed by means of a suitable bead breaking unit, normally present on the tyre changing machine itself.

Bead breaking units of known type generally comprise an arm with a first extremity hinged to the bed of the tyre changing machine according to a substantially vertical axis and a second extremity having a bead breaking tool, otherwise known as blade.

On the bed is fastened a supporting element, usable to correctly fit the rim during the bead breaking operation.

This locator element has a vertical support surface, otherwise known as pad, which is made of suitable material, and usually knurled in such a way as to increase the friction coefficient with the wheel.

The bead breaking units of known type generally comprise a linear actuator of the type, e.g., of a fluid actuator cylinder for moving the arm.

The actuator cylinder is generally fastened to the bed and the stem thereof is associated sliding with the arm.

The stem has a drive element which, during movement from the extracted position to the retracted position, is suitable for engaging on the arm to drive it towards the bed.

During use, in an idle position of the bead breaking unit, the stem of the cylinder is normally extracted and the arm, which can be freely rotated around its hinging axis, is in a closer position with respect to the bed of the tyre changing machine due to the action of one or more return springs.

An operator, once the portion of the wheel to undergo bead breaking has been suitably positioned in correspondence to the pad, manually moves the arm until the blade is positioned in contact with a section of the tyre bead.

Subsequently, the operator starts the actuator cylinder, moving the stem from the extracted position to the retracted position.

This way, the arm is driven by the stem and the blade pushes the tyre bead, detaching it from the edge of the rim.

Subsequently, the stem of the actuator cylinder is moved to extracted position and the operator manually extracts the blade inserted between tyre and rim.

Once the wheel has been removed, the arm is again moved to near position with respect to the bed of the tyre changing machine due to the action of the return spring.

Furthermore, bead breaking units are known able to perform the automated extraction of the blade inserted between tyre and rim, following bead breaking.

In such bead breaking units, in particular, the stem of the actuator has a thrust element which is suitable for engaging on a respective locator element on the arm during the movement of the stem itself from the retracted position to the extracted position, so as to move the blade from the wheel.

The known bead breaking units do however have a number of drawbacks.

In particular, the stroke of the blade during bead breaking, given by the movement of the stem of the actuator between the extracted position and the retracted position, is always the same, whatever the type of tyre which has to undergo bead breaking.

Consequently, the larger the width of the tyre to undergo bead breaking, the greater the chance of damaging the tyre itself due to the excessive penetration of the blade between the bead and the rim.

Furthermore, following the bead breaking of a section of the tyre bead, the arm is returned by the return springs to a closer position with respect to the machine bed, with the blade arranged in the proximity of the wheel supporting pad.

Consequently, in the event of the wheel having to be rotated for the bead breaking of another section of the bead or in the event of the bead breaking of another wheel, the operator must necessarily keep the arm away from the wheel with his/her hand before rotating and correctly positioning the wheel with his/her other hand.

Such operation is therefore difficult and complicated for the operator, who must precisely position the blade in correspondence to the section of bead to undergo bead breaking.

The main object of the present invention is to provide a bead breaking unit for tyre changing machines which allows the optimum bead breaking of tyres of different types and sizes.

Another object of the present invention is to provide a bead breaking unit for tyre changing machines which allows simplifying the wheel positioning operation before bead breaking.

Another object of the present invention is to provide a bead breaking unit for tyre changing machines which allows overcoming the mentioned drawbacks of the state of the art within the ambit of a simple, rational, easy and effective to use as well as low cost solution.

The above objects are achieved by the present bead breaking unit for tyre changing machines, comprising at least one arm associated rotatable with a supporting structure, at least a bead breaking tool associated with said arm and a movement apparatus associated with said arm and suitable for moving said arm from a disengagement position, wherein said bead breaking tool is substantially moved away from the tyre of a wheel to undergo bead breaking, to an operating position, wherein said bead breaking tool is engaged on said tyre, wherein said arm comprises an adjustment apparatus for adjusting the position of said bead breaking tool along a near/away direction to/from said wheel, said adjustment apparatus being suitable for adjusting the position of said bead breaking tool when said arm is in said disengagement position, depending on the sizes and/or type of said wheel.

Other characteristics and advantages of the present invention will become more evident from the description of two preferred, but not sole, embodiments of a bead breaking unit for tyre changing machines, illustrated purely as an example but not limited to the annexed drawings in which.

Figure 1:
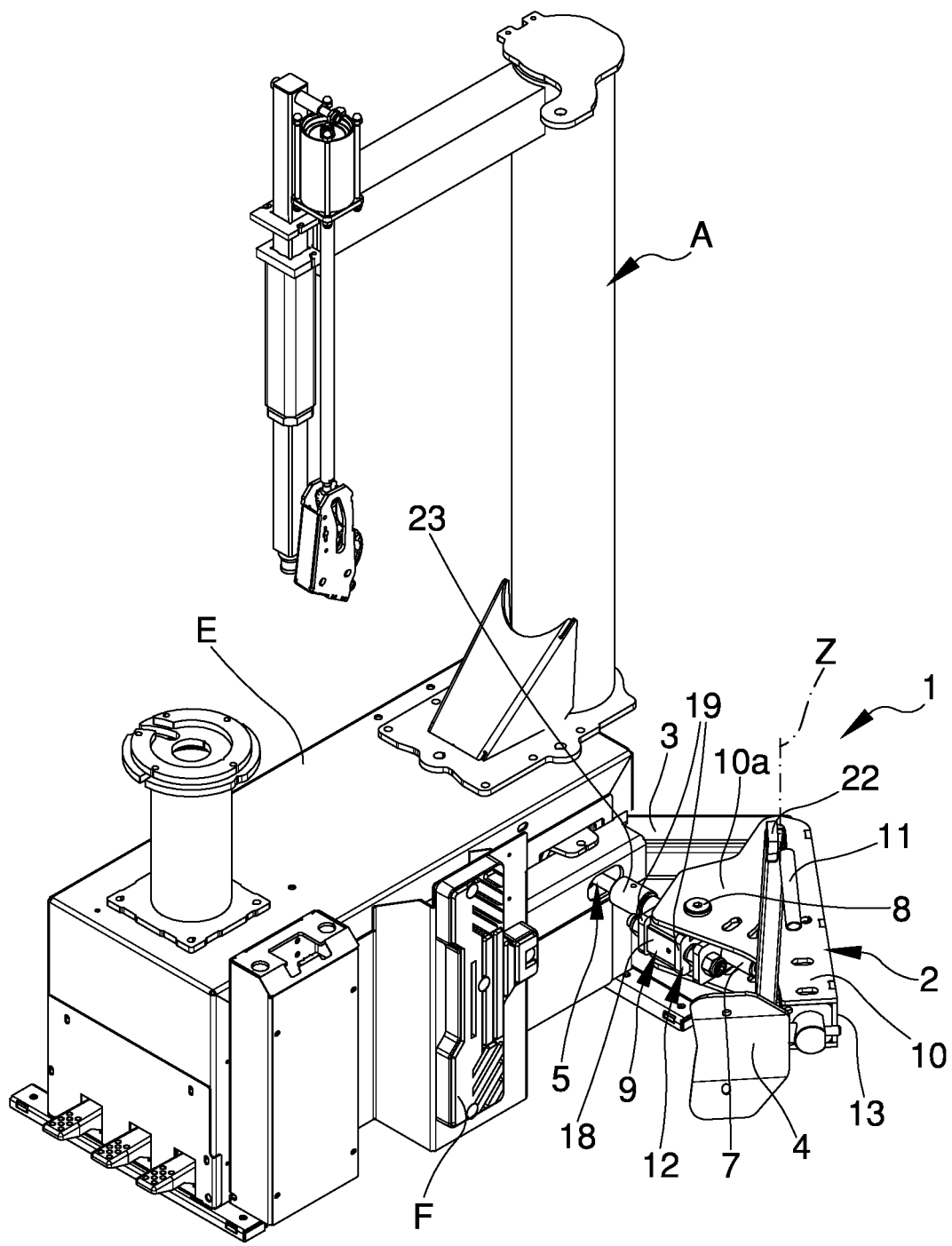
FIG. 1 is an axonometric view of a first embodiment of the bead breaking unit according to the invention fitted on a general tyre changing machine.

With particular reference to such figures, globally indicated by 1 is a bead breaking unit which can be fitted on a tyre changing machine A of known type and usable for the first detachment of the bead of a tyre B from the respective rim C of a wheel D, before the fitting/removing operation of the tyre itself.

The bead breaking unit 1 comprises an arm 2 associated rotatable with a supporting structure 3, a bead breaking tool 4 supported by the arm 2 and a movement apparatus 5 associated with the arm 2.

The bead breaking tool 4 is preferably composed of a so-called blade.

As shown in the illustrations, the supporting structure 3 can be composed of a support which extends overhanging from the bed E of the tyre changing machine A.

Alternative solutions cannot however be ruled out wherein, e.g., the supporting structure 3 is composed directly of the bed E of the tyre changing machine A or, in any case, of a portion of the tyre changing machine itself.

The arm 2 has an extremity hinged to the free extremity of the support 3 and is rotatable around a vertical rotation axis Z.

The bed E of the tyre changing machine A has a vertical support plate F meant to accommodate by resting a side of the wheel D to undergo bead breaking arranged vertically.

The movement apparatus 5 is suitable for moving the arm 2 from a disengagement position, wherein the blade 4 is substantially moved away from the support plate F and, therefore, from the tyre B of a wheel D to undergo bead breaking, to an operating position, wherein the blade 4 is moved near the support plate F and is suitable for engaging on a section of the tyre B to detach the bead from the edge of the rim C.

The movement apparatus 5 is preferably composed of a linear actuator, of the type of a fluid actuator cylinder.

In the preferred embodiment shown in the illustrations, the cylinder 6 of the linear actuator 5 is fixed inside a specific housing obtained in the bed E.

The stem 7 of the linear actuator 5 extends horizontally from the bed E.

Advantageously, the bead breaking unit 1 comprises an adjustment apparatus for adjusting the position of the bead breaking tool 4, generally indicated in the illustrations by the reference 9.

In particular, the adjustment apparatus 9 is suitable for adjusting the position of the blade 4 along a near/away direction with respect to the wheel D, depending on the sizes and/or the type of wheel.

In actual facts, quite apart from the width of the tyre B, the blade 4 can be positioned in correspondence to the section of the tyre B to undergo bead breaking, when the arm 2 is in disengagement position and before the bead breaking operation.

It is therefore possible to make optimum positioning by means of the adjustment apparatus 9 and the movement of the blade 4 for bead breaking is done afterwards by the linear actuator 5.

This way, the stroke made by the blade 4 during bead breaking can be changed, varying in particular the initial position and the end position of the blade 4 according to the sizes of the tyre B to undergo bead breaking, therefore avoiding damage to the tyre caused by too much insertion of the blade 4 between the bead of the tyre B and the edge of the rim C.

Once bead breaking has been done, the blade 4 returns to the initial disengagement position, with the blade 4 in the proximity of the bead of the tyre B, consequently simplifying the subsequent rotation operations of the wheel D for the bead breaking of another section of the bead and also simplifying the positioning of another wheel of the same size.

With particular but not sole reference to a first embodiment of the bead breaking unit 1, shown in the figures from 1 to 7, the arm 2 comprises a supporting element 10 of the blade 4, sustained by the support 3 and mobile between a maximum opening position and a minimum opening position along the near/away direction to/from the wheel D.

In particular, by the expression "maximum opening position" is meant the position of maximum distance of the blade 4 with respect to the support plate F meant to accommodate by resting a wheel D.

Similarly, by the expression "minimum opening position" is meant the position of minimum distance of the blade 4 with respect to the support plate F meant to accommodate by resting a wheel D.

In particular, the supporting element 10 is associated rotatable with the support 3 around the rotation axis Z.

The supporting element 10 is rotatable manually with respect to the support 3 and, usefully, it has a grip handle 11.

The possibility of moving the supporting element 10 in an automated way cannot however be ruled out.

The supporting element 10 comprises a pair of plates 10a separated from one another and associated integral with one another by means of a reinforcement element 13.

The plates 10a are both hinged to the support 3 around the rotation axis Z.

The supporting element 10, furthermore, is associated sliding with the stem 7 of the linear actuator 5.

In particular, the adjustment apparatus 9 comprises a guide element 18 of the stem 7, arranged between the plates 10a and hinged rotatable to the plates 10a in correspondence to the hinging pin 8.

The guide element 18 has a through hole inside which the stem 7 of the linear actuator 5 is fitted sliding to measure.

The adjustment apparatus 9, furthermore, comprises a locking/release device for locking/releasing the stem 7 to/from the guide element 18 and, therefore, to/from the supporting element 10, generally indicated in the illustrations by the reference 12.

Usefully, the locking/release device 12 comprises two braking elements 19 suitable for stopping the sliding of the stem 7 with respect to the supporting element 10.

Each of the braking elements 19 is arranged between the plates 10a and has a hole 20 for the transit of a section of the stem 7.

Figure 3:
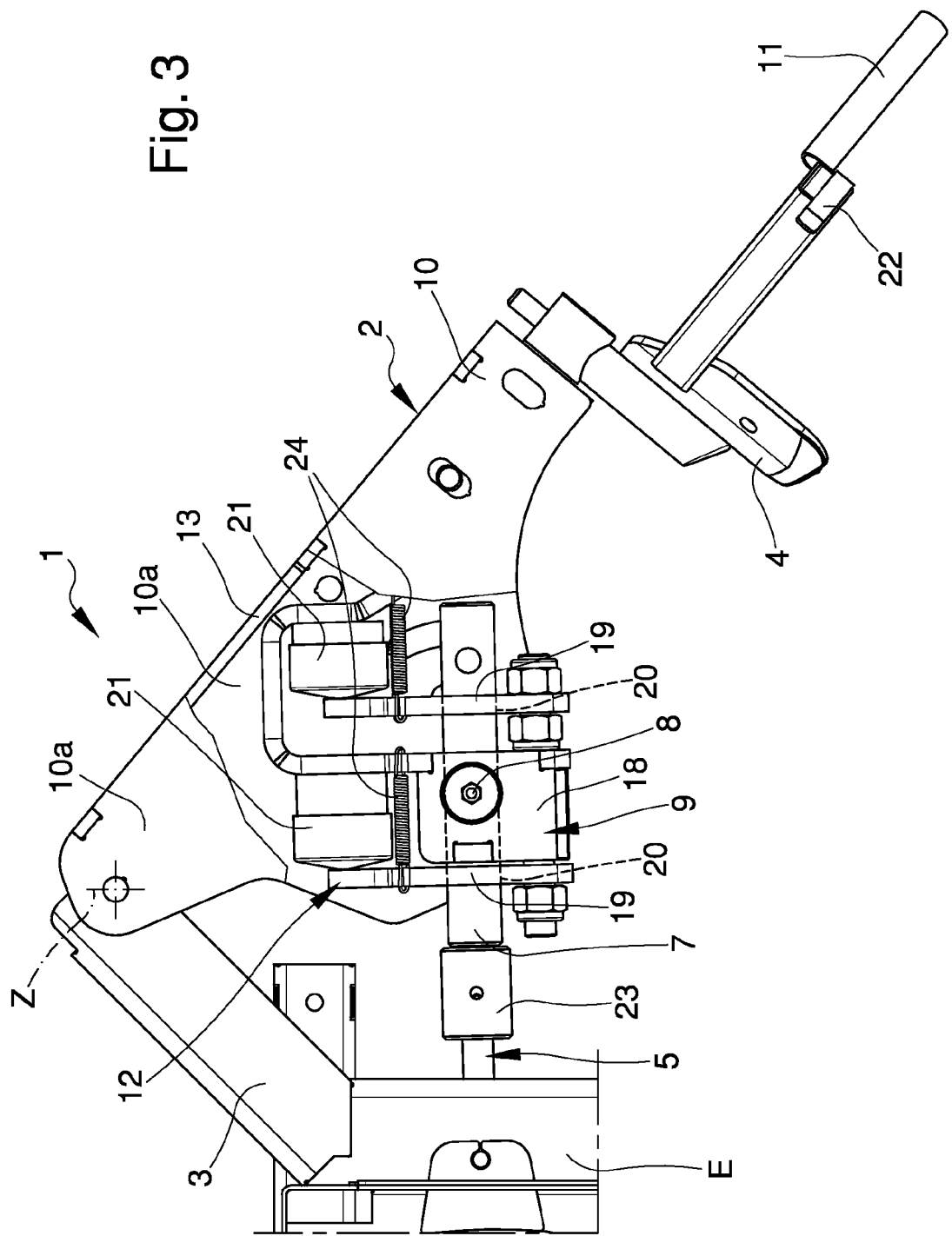
Figure 5:
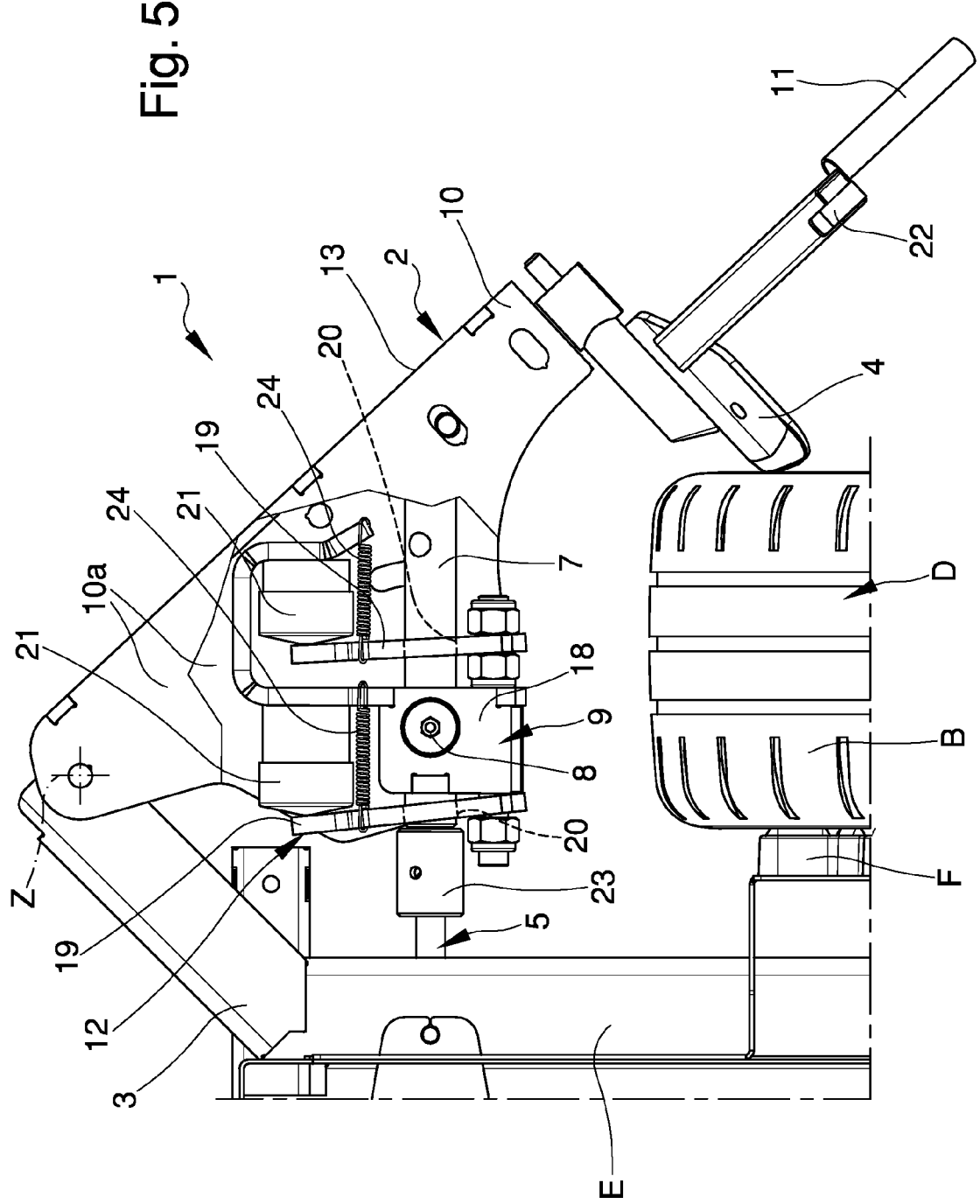

The braking elements 19 are mobile due to the action of two actuators 21 between a sliding position, shown in FIG. 3, wherein the hole 20 of each of the braking elements 19 is coupled with the stem 7 with play, so as to allow it to slide inside it, and a locking position, shown in FIG. 5, wherein the hole 20 of each of the braking elements 19 is substantially inclined with respect to the stem 7 and the walls of the hole 20 are engaged on the stem 7, so as to stop it sliding.

The actuators 21 are associated integral with the guide element 18.

Usefully, the actuators 21 are normally engaged on the braking elements 19, so as to incline them for locking the stem 7.

The actuators 21, once started, move away from the braking elements 19, which move to the sliding position due to the action of the return springs 24.

Usefully, the actuators 21 can be started by means of a button 22 located in the proximity of the handle 11.

Different embodiments cannot however be ruled out of the arm 2, of the adjustment apparatus 10 and of the locking/release device 12.

In a possible alternative embodiment, e.g., the supporting element 10 can be fixed to the stem 7 of the linear actuator 5 in pre-defined positions.

In particular, such positions can be defined by a plurality of through holes made in several points on the plates 10a and/or on the stem 7 and locking can be performed by inserting a special pin inside such holes.

Usefully, this solution could also be provided for the bead breaking unit 1 shown in the figures from 1 to 7 and could be used in case of a fault of the adjustment apparatus 9.

Advantageously, the bead breaking unit 1 can have a variation device for varying the stroke of the arm 2 between the disengagement position and the operating position indicated in the illustrations by the reference 23.

The variation device 23 of the stroke of the arm 2 can be composed, e.g., of a specific threaded ring nut fitted on the stem 7 of the linear actuator 5. In this case, the position of the ring nut can be adjusted along the stem 7 and the ring nut defines an end-of-stroke locator for the stem itself.

The operation of the bead breaking unit 1 according to the first embodiment shown in the figures from 1 to 7 is described below.

Figure 2:
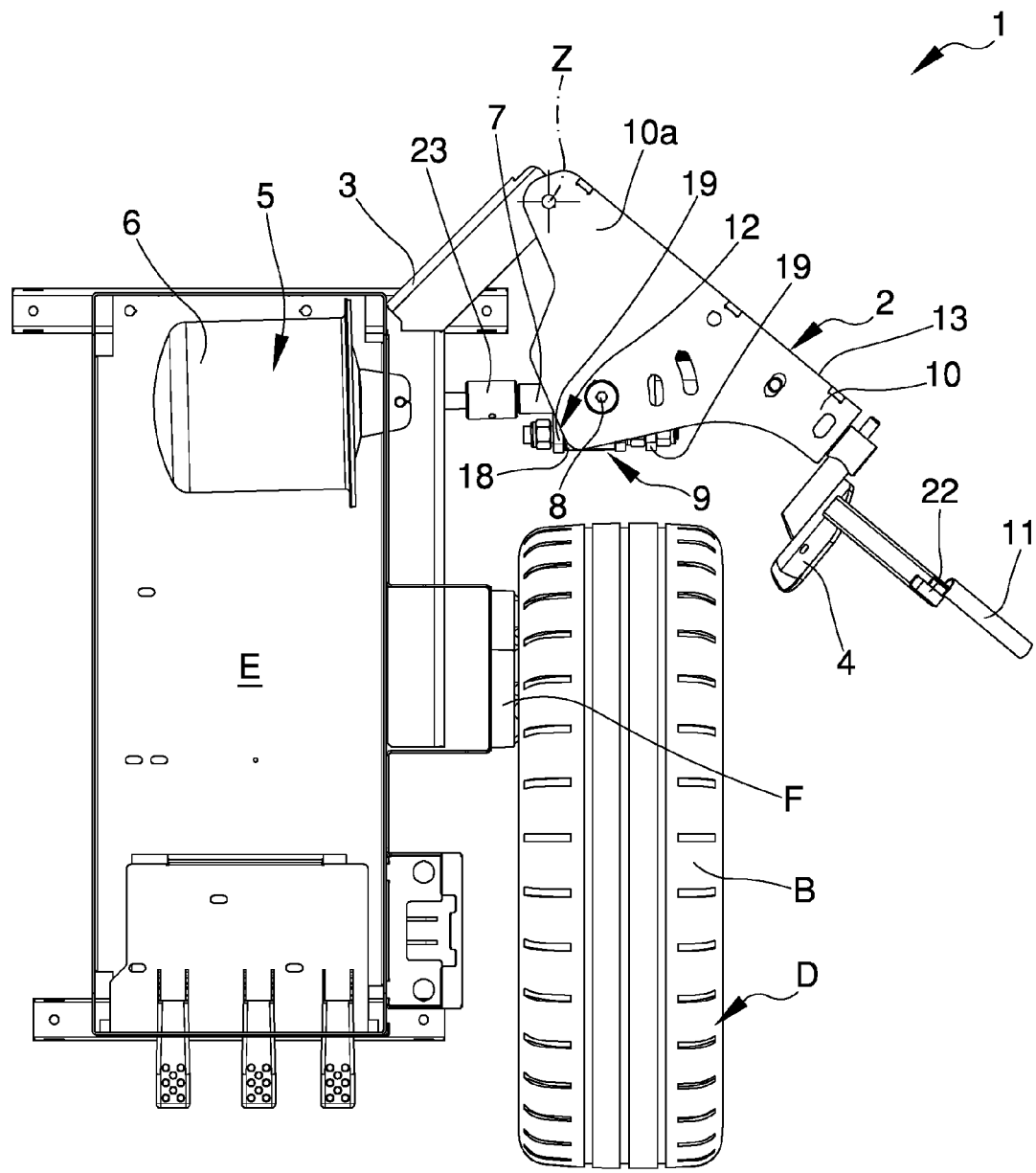
FIGS. 2 to 7 are views from above which illustrate the operation of the bead breaking unit of FIG. 1.

The bead breaking unit 1 is initially in a similar configuration to that shown in FIGS. 1 and 2, with the blade 4 moved away from the support plate F and with the supporting element 10 in the proximity of the maximum opening position with respect to the arm 2.

An operator positions a wheel D to undergo bead breaking on top of the support plate F (FIG. 2).

Subsequently, the operator presses the button 22 in the proximity of the handle 11, to start the actuators 21 which retract.

The braking elements 19 then move to a position at right angles to the stem 7 due to the action of specific return springs 24. In this position, the stem 7 is coupled with play with the holes 20 on the braking elements 19 and, therefore, the stem 7 is free to slide inside the holes 20 (FIG. 3).

This permits the free rotation of the supporting element 10.

Figure 4:
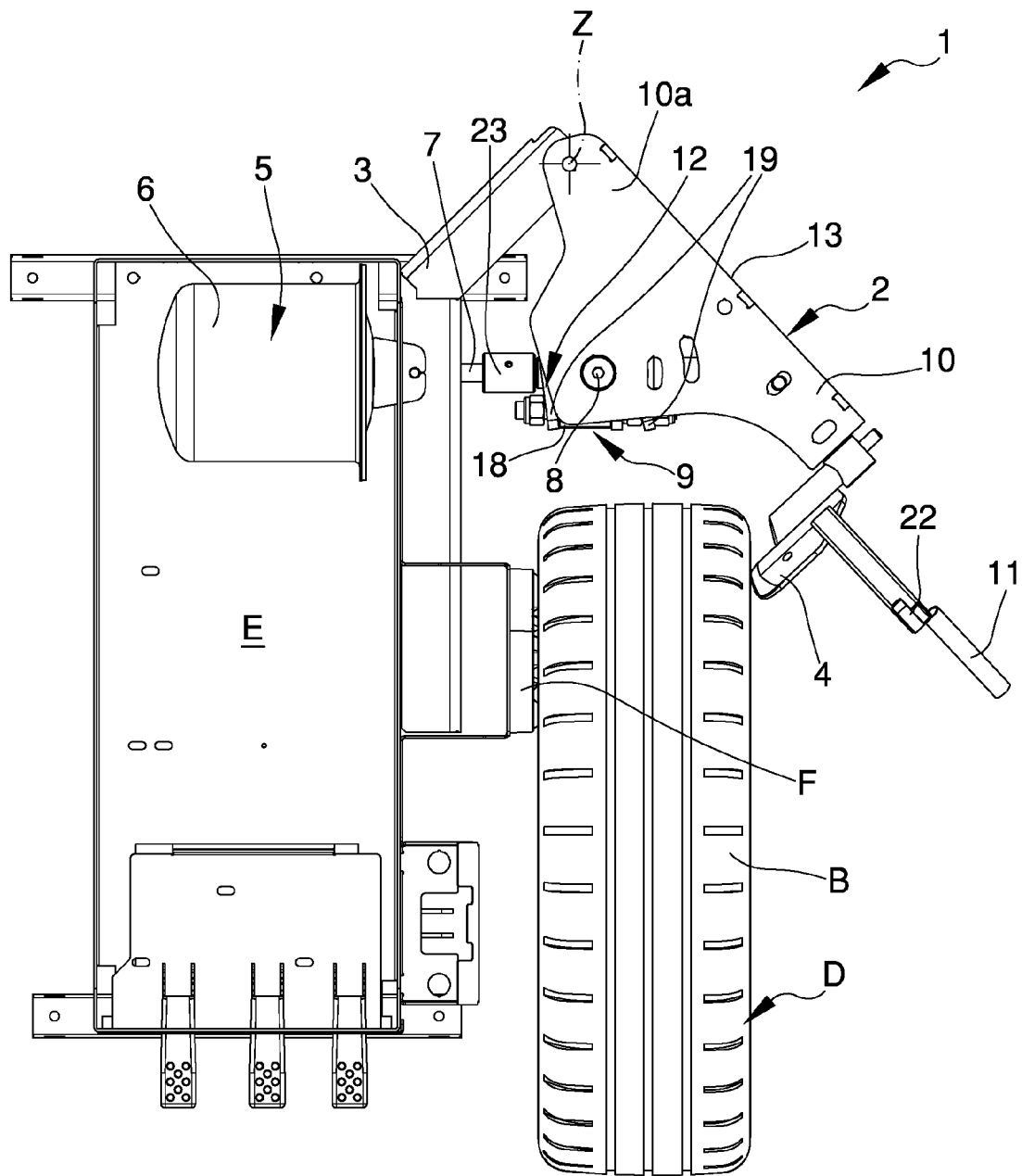

Subsequently, the operator, by operating the handle 11, moves the blade 4 in the proximity of the section of tyre B to undergo bead breaking (FIG. 4).

During such movement, the plates 10a of the supporting element 10 turn with respect to the stem 7, which is instead still.

By means of the button 22, the operator starts the actuators 21, which press on the braking elements 19 conveying them to the locking position of the stem 7, wherein the walls of the hole 20 are engaged on the stem itself (FIG. 5).

In such configuration, the supporting element 10, and therefore the plates 10a, is integral with the stem 7.

Figure 6:
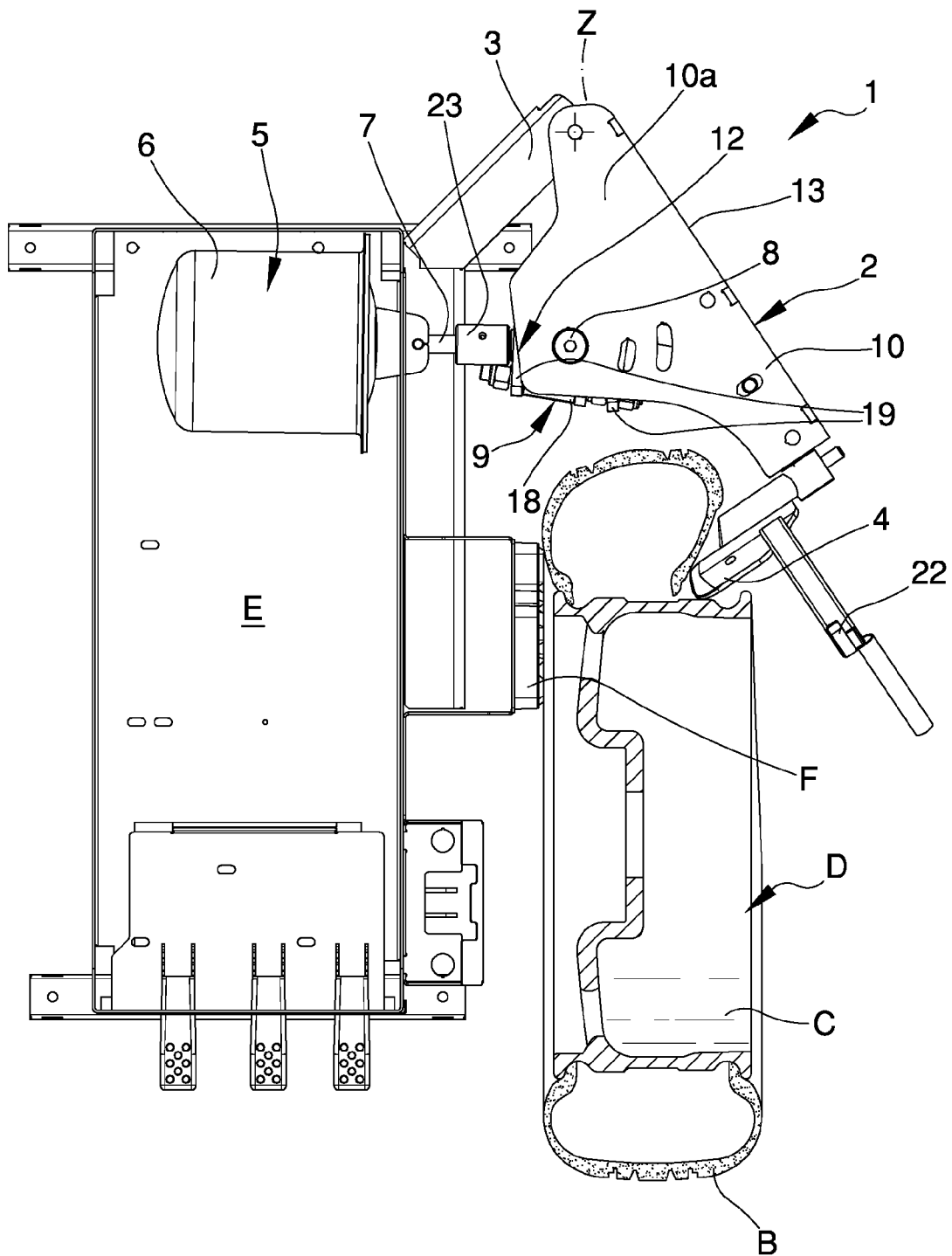

Subsequently, by means of a specific control, being e.g. one of the pedal units of the tyre changing machine A, the operator starts the linear actuator 5, which retracts the stem 7 causing the arm 2 to rotate from the disengagement position to the operating position (FIG. 6).

In such operating position, the blade 4 is fitted between the tyre B and the rim C and the bead of the tyre B is moved away from the edge of the rim C.

Figure 7:
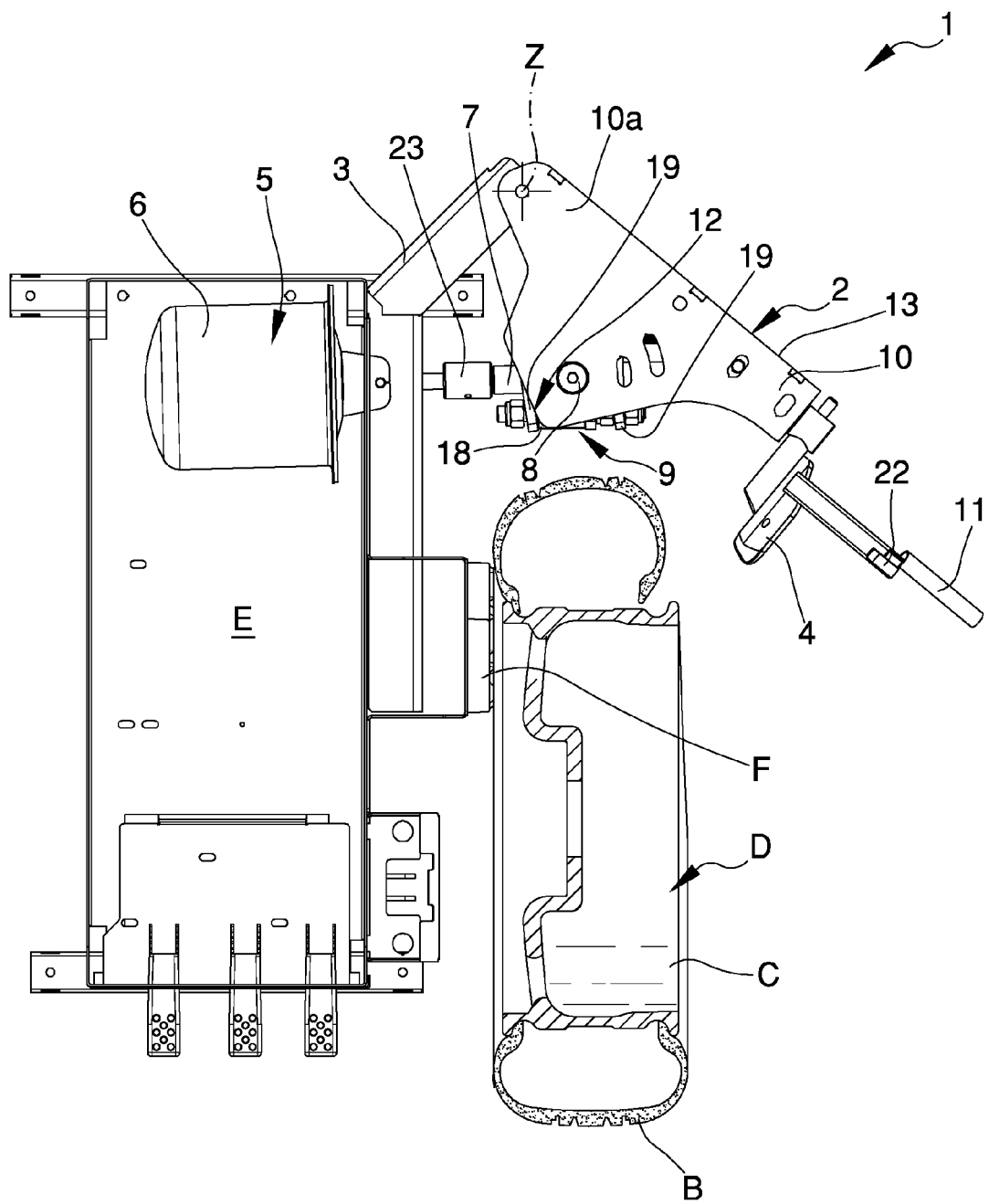
Figure 8:
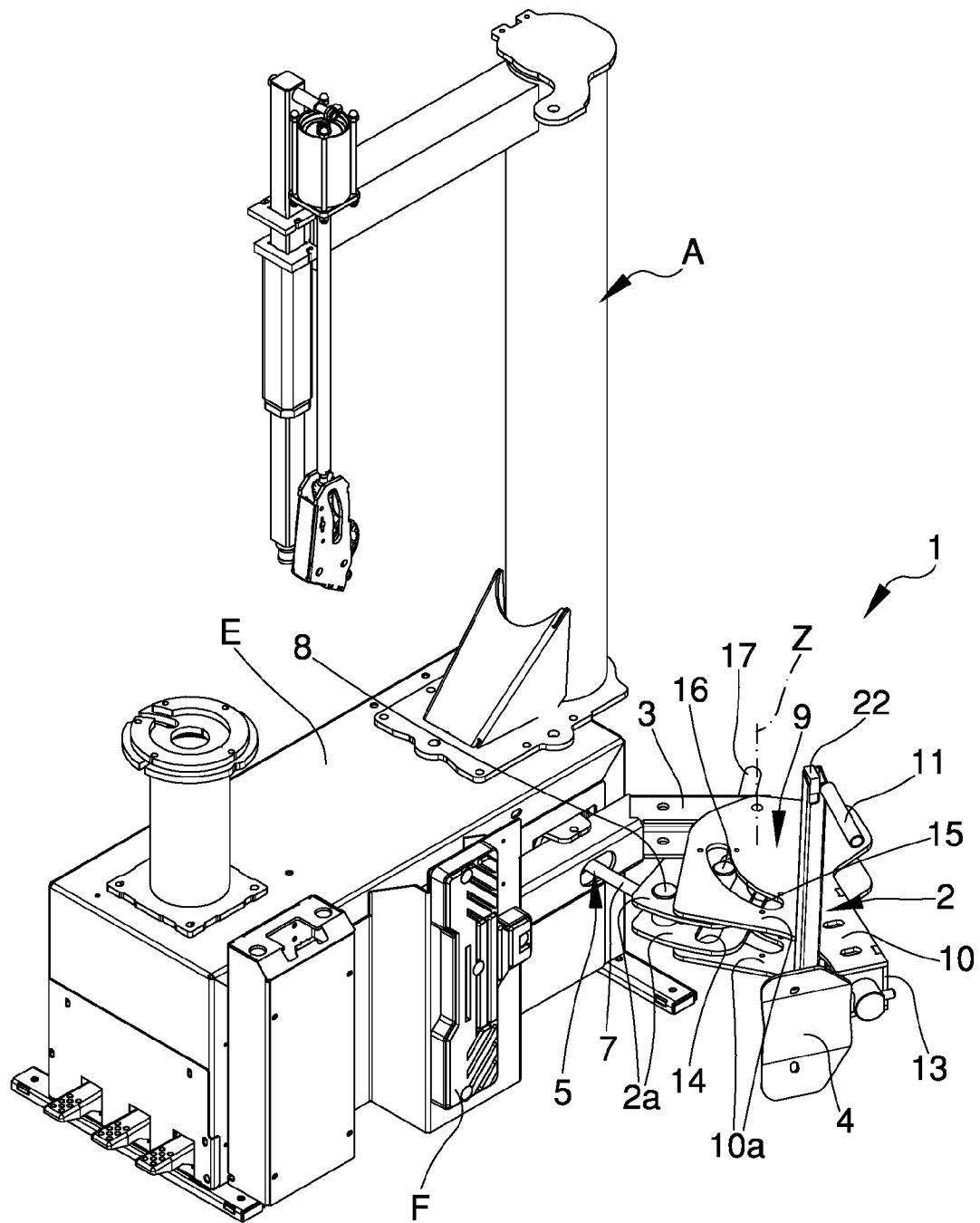
FIG. 8 is an axonometric view of a second embodiment of the bead breaking unit according to the invention fitted on a general tyre changing machine.

Subsequently, the linear actuator 5 returns the arm 2 to the disengagement position and, therefore, extracts the blade 4 (FIG. 7).

In this position, the blade 4 is already in the proximity of the tyre, in an optimum position to perform the bead breaking of another section of the tyre B of the same wheel D or to perform the bead breaking of another wheel D with a tyre B of the same size.

The operation can be repeated in the same way for tyres of different sizes and type.

With particular but not sole reference to an alternative second embodiment of the bead breaking unit 1, shown in the figures from 8 to 14, the arm 2 comprises a connection element 2a associated rotatable with the support 3, to which the extremity of the stem 7 of the linear actuator 5 is hinged.

In particular, the stem 7 of the linear actuator 5 extends horizontally from the bed E and has its extremity hinged to the arm 2 by means of a hinging pin 8.

The adjustment apparatus 9 comprises a supporting element 10 of the blade 4, supported by the support 3 and mobile with respect to the connection element 2a between a maximum opening position and a minimum opening position along the near/away direction to/from the wheel D.

In particular, by the expression "maximum opening position" is meant the position of maximum distance of the blade 4 with respect to the support plate F intended to accommodate by resting a wheel D.

In the same way, by the expression "minimum opening position" is meant the position of minimum distance of the blade 4 with respect to the support plate F intended to accommodate by resting a wheel D.

Always with reference to the second embodiment of the bead breaking unit 1 shown in the figures from 8 to 14, the supporting element 10 is associated rotatable with the support 3 and the rotation axis of the supporting element 10 coincides with the rotation axis of the connection element 2a with respect to the support 3.

The supporting element 10 is manually rotatable with respect to the connection element 2a and, usefully, has a grip handle 11.

The possibility of moving the supporting element 10 in an automated way cannot however be ruled out.

The adjustment apparatus 9 comprises, furthermore, a locking/release device of the supporting element 10 with respect to the connection element 2a, generally indicated in the illustrations by the reference 12.

Always with reference to the second embodiment of the bead breaking unit 1, the connection element 2a comprises a pair of first plates 2a integral and separated the one from the other.

The first plates 2a are both hinged to the support 3 around the rotation axis Z and to them is hinged the extremity of the stem 7 of the linear actuator 5, in correspondence to the hinging pin 8.

The supporting element 10 comprises a pair of second plates 10a separated from one another and associated integral the one with the other by means of a reinforcement element 13.

The second plates 10a are arranged below and above the first plates 2a respectively and are both hinged to the support 3 around the rotation axis Z.

The locking/release device 12 comprises a pair of first rectilinear slots 14 obtained on each of the first plates 2a respectively of the arm 2 and a pair of second curvilinear slots 15 obtained on each of the second plates 10a respectively of the supporting element 10.

The first slots 14 and the second slots 15 are partially superimposed and extend along directions substantially transversal the one to the other.

A locking pin 16 crosses each of the first slots 14 and of the second slots 15 and is engaged sliding inside these.

The locking/release device 12 comprises a stop device of the locking pin 16 with respect to the first slots 14.

The stop of the locking pin 16 inside the first slots 14, in actual facts, makes the supporting element 10 integral with the connection element 2a.

When, on the other hand, the locking pin 16 is free to slide inside the first slots 14, the supporting element 10 is free to move with respect to the connection element 2a.

The stop device comprises a rod 17 fastened, at one extremity, to the locking pin 16 and associated axially sliding with the first plates 2a.

In particular, the rod 17 is fitted sliding to measure inside a through hole obtained on a guide element 18 fastened to the first plates 2a.

The rod 17 is axially sliding along a direction substantially coaxial to the longitudinal axis of the first rectilinear slots 14.

The stop device comprises a braking element 19 suitable for stopping the sliding of the rod with respect to the arm 2.

The braking element 19 is arranged between the first plates 2a and has a hole 20 for the transit of a section of the rod 17.

Figure 10:
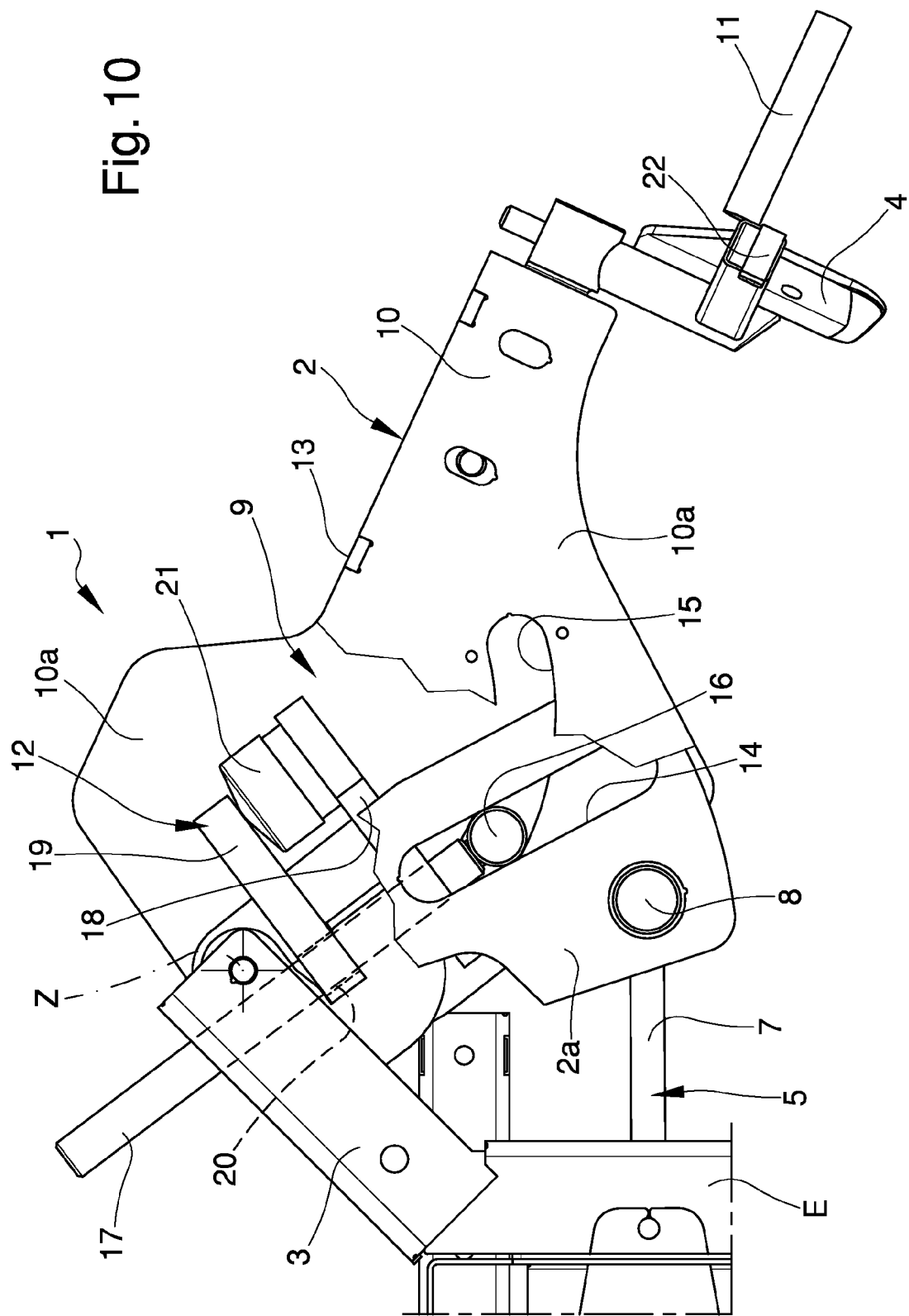
Figure 12:
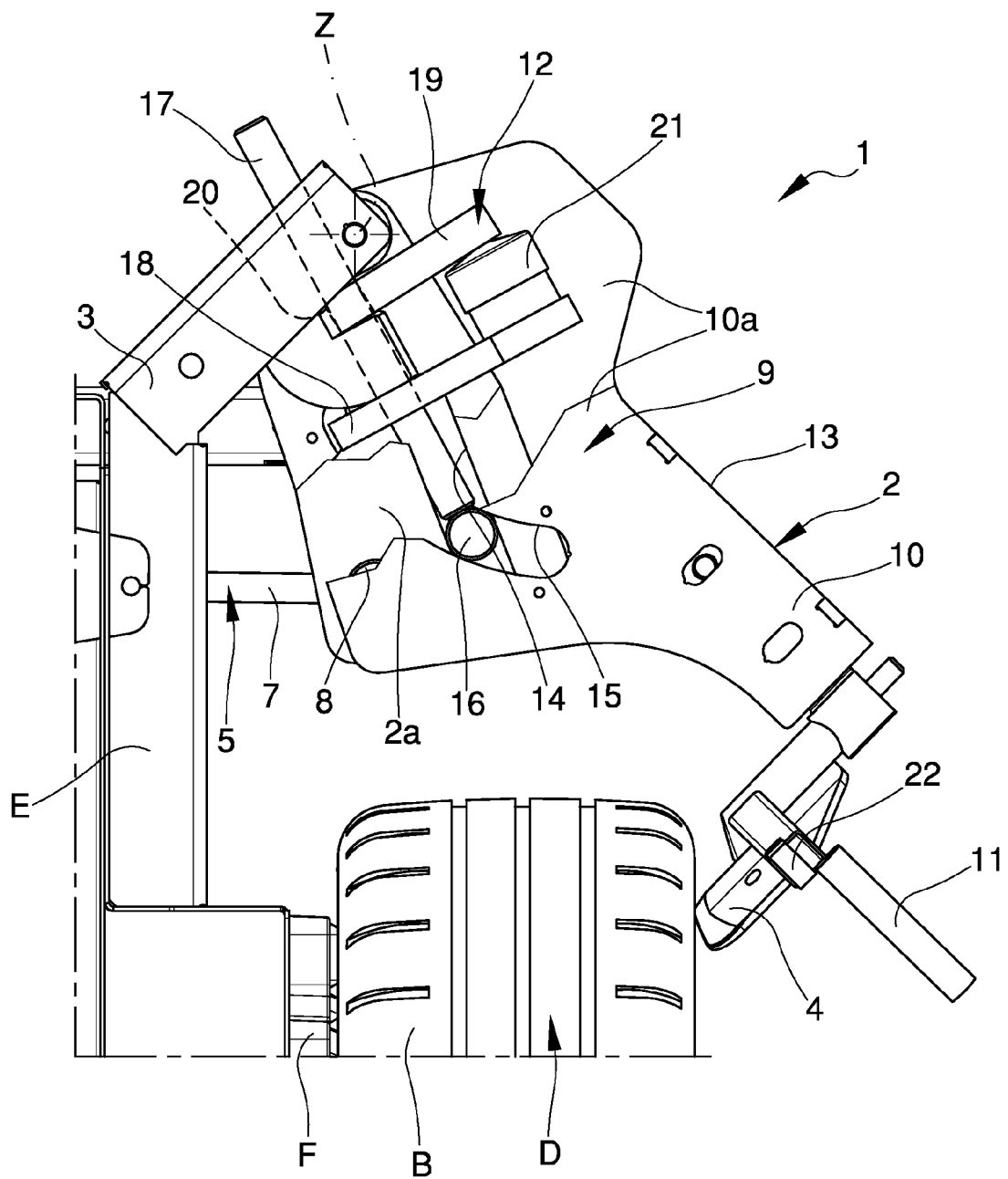

The braking element 19 is mobile due to the action of an actuator 21 between a sliding position, shown in FIG. 10, wherein the hole 20 of the braking element 19 is coupled with the rod 17 with play, so as to allow this to slide inside it, and a locking position, shown in FIG. 12, wherein the hole 20 is substantially inclined with respect to the rod 17 and the walls of the hole 20 are engaged on the rod 17, so as to stop the sliding thereof.

Usefully, the actuator 21 is normally engaged on the braking element 19, so as to incline it to stop the rod 17.

Once started, the actuator 21 moves away from the braking element 19, which moves to sliding position due to the action of the return springs not shown in the illustrations.

Usefully, the actuator 21 can be started by means of a button 22 arranged in the proximity of the handle 11.

Different embodiments of the arm 2 and of the adjustment apparatus 10 cannot however be ruled out.

In a possible alternative embodiment, e.g., the supporting element 10 can be fastened to the connection element 2a in predefined positions.

In particular, such positions can be defined by a plurality of through holes made at several points on the first plates 2a and/or on the second plates 10a and locking can be achieved by fitting a specific pin inside such holes.

Usefully, such solution could also be contemplated for the bead breaking unit 1 shown in the figures from 8 to 14 and could be used in case of a fault affecting the adjustment apparatus 9.

Advantageously, the bead breaking unit 1 can have a variation device for varying the stroke of the arm 2 between the disengagement position and the operating position.

Such variation device can be made up, e.g., of a specific threaded ring nut fitted on the stem 7 of the linear actuator 5. In this case, the position of the ring nut can be adjusted along the stem 7 and the ring nut defines an end-of-stroke locator for the stem itself.

The operation of the bead breaking unit 1 according to the second embodiment shown in the figures from 8 to 14 is described below.

The bead breaking unit 1 is initially in a configuration the same as that shown in the FIGS. 1 and 2, with the blade 4 moved away from the support plate F and with the supporting element 10 in the proximity of the maximum opening position with respect to arm 2.

Figure 9:
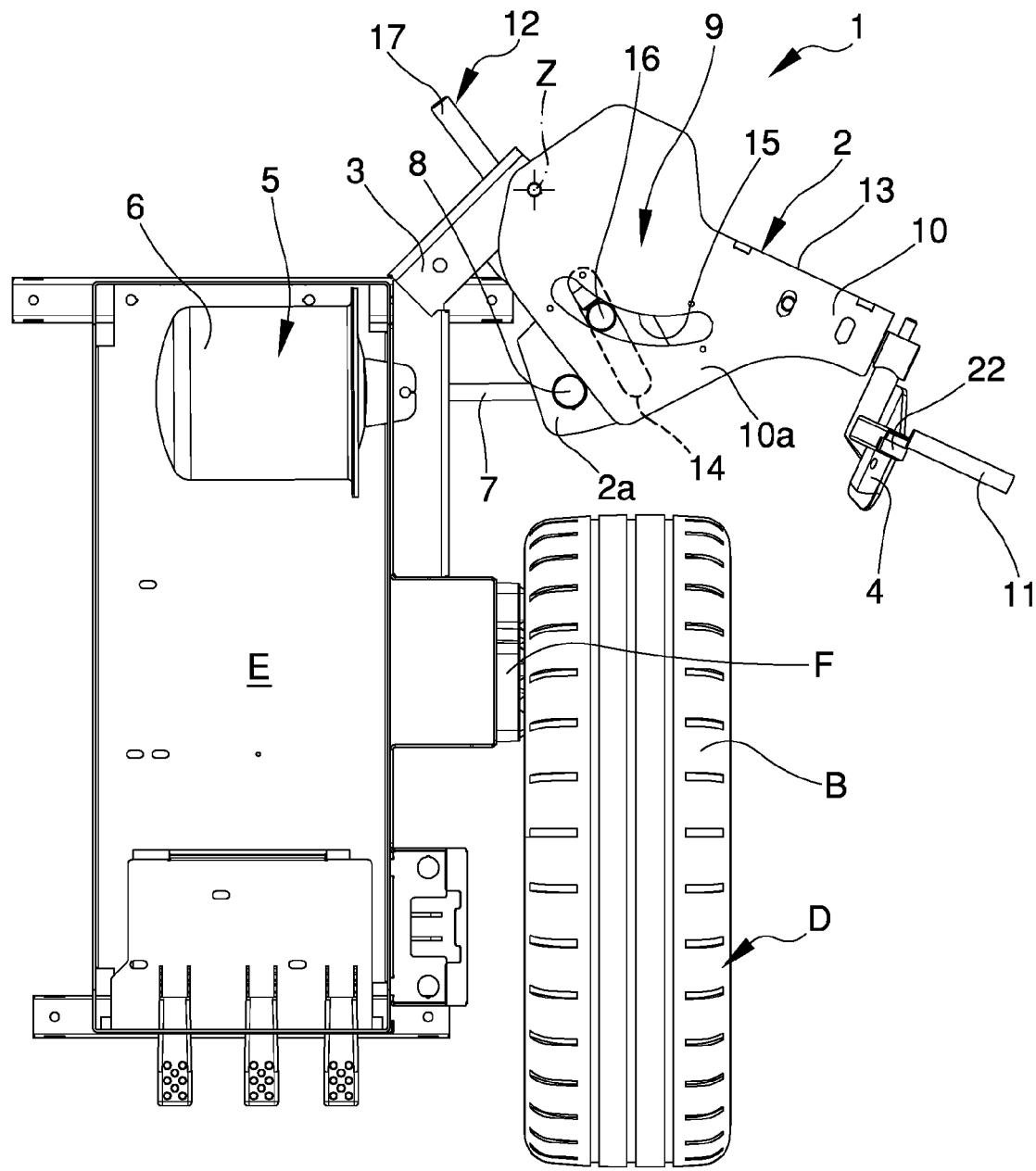
FIGS. 9 to 14 are views from above which illustrate the operation of the bead breaking unit of FIG. 8.

An operator positions a wheel D to undergo bead breaking on top of the support plate F (FIG. 9).

Subsequently, the operator presses the button 22 in the proximity of the handle 11, to start the actuator 21 which retracts.

The braking element 19 then moves to a position at right angles to the rod 17 due to the action of specific return springs. In this position, the rod 17 is coupled with play with the hole 20 on the braking element 19 and, consequently, the rod 17 is free to slide inside the hole 20 (FIG. 10).

This permits the free movement of the locking pin 16 inside the first slots 14.

Figure 11:
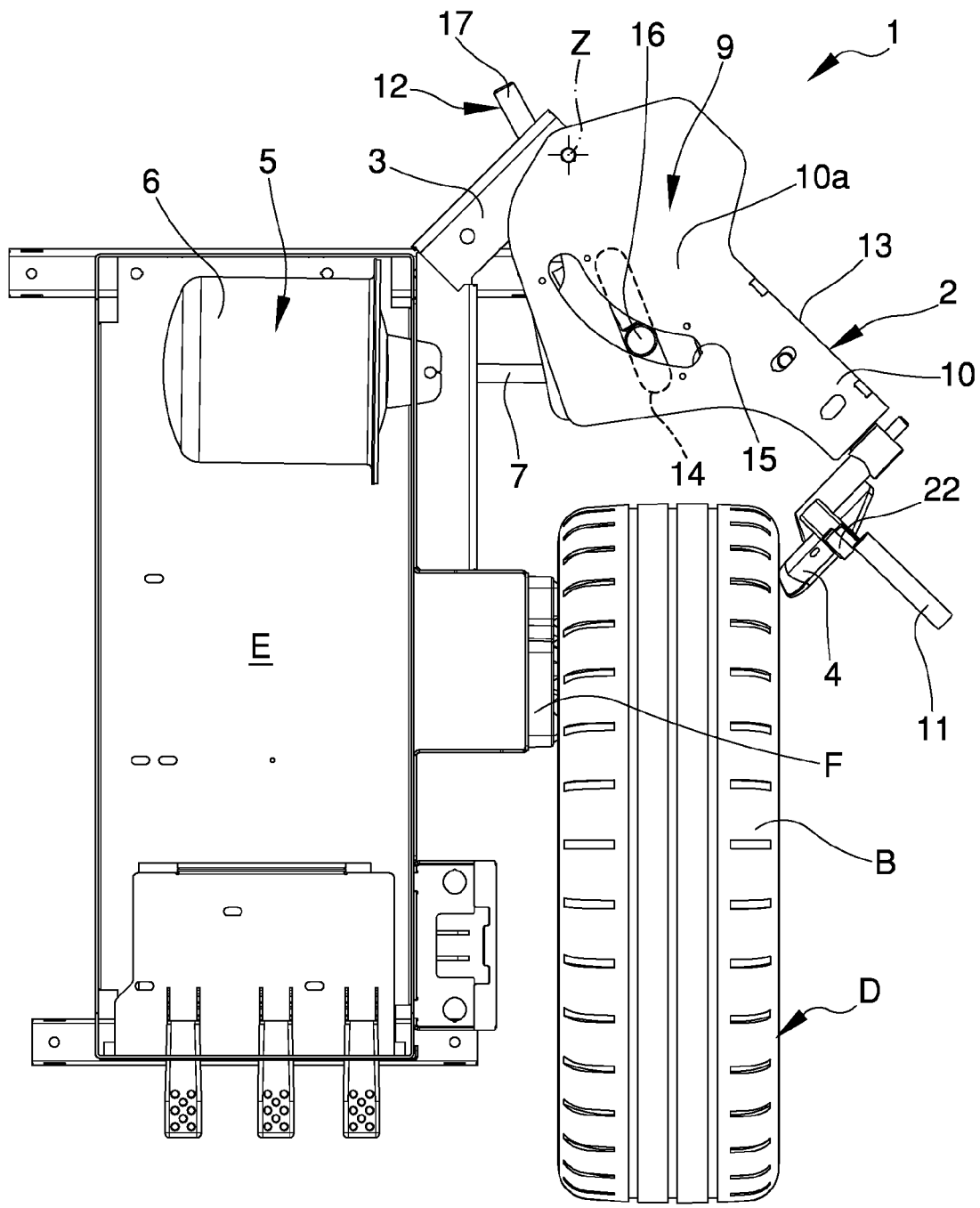

Subsequently, the operator, by means of the handle 11, moves the blade 4 in the proximity of the section of the tyre B to undergo bead breaking (FIG. 11).

During such moving, the second plates 10a of the supporting element 10 rotate with respect to the first plates 2a of the arm 2, which are instead still.

Such movement of the second plates 10a with respect to the first plates 2a is made possible by the movement of the pin 16 inside the first slots 14 and by the particular conformation and arrangement of the first and second slots 14 and 15.

By means of the button 22, the operator starts the actuator 21, which presses on the braking element 19 moving it to the locking position of the rod 17, wherein the walls of the hole 20 are engaged on the rod itself (FIG. 12).

In such configuration the supporting element 10, and therefore the second plates 10a, is integral with the arm 2, and therefore with the first plates 2a.

Figure 13:
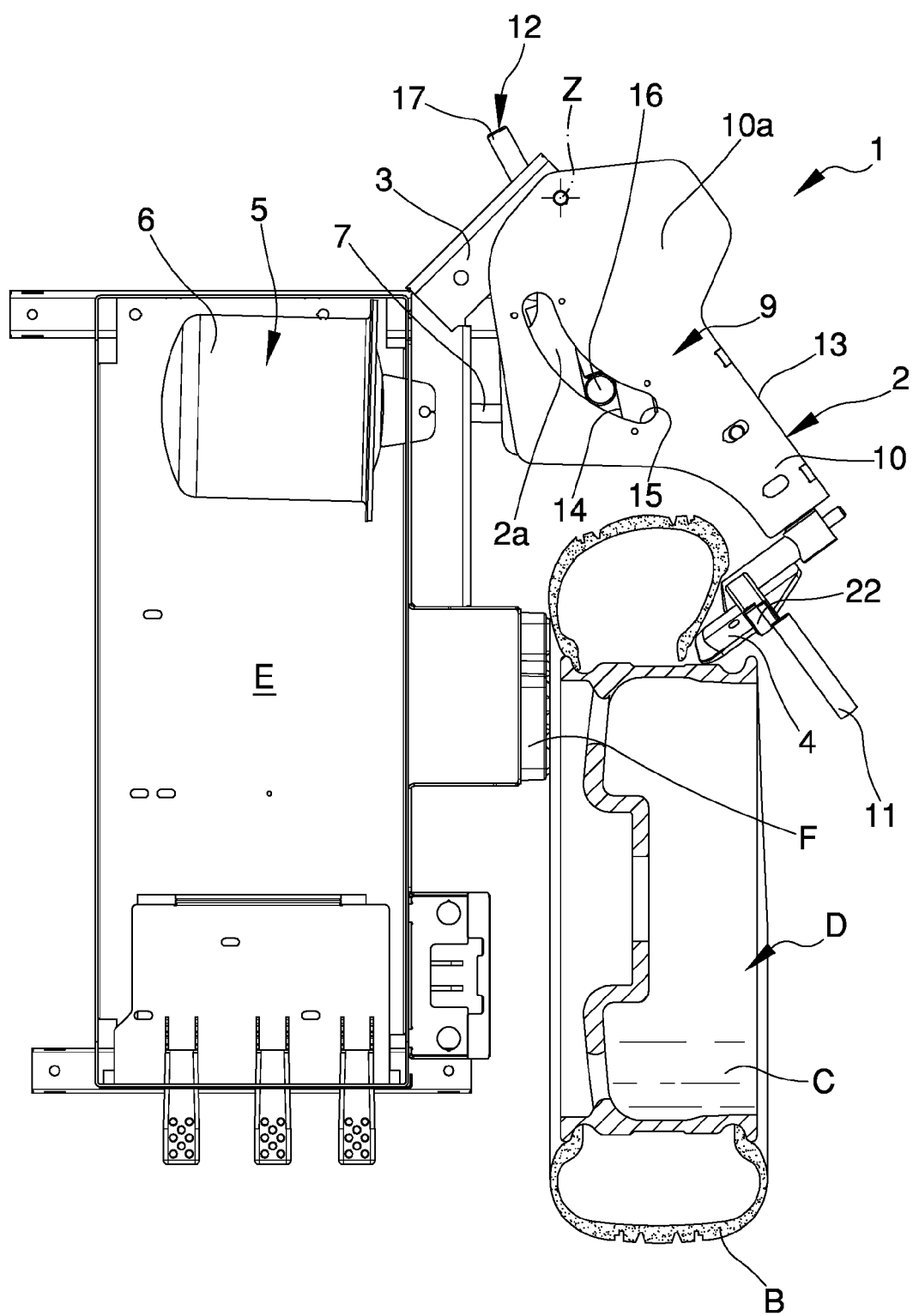

Subsequently, by means of a specific control, e.g. one of the pedal units of the tyre changing machine A, the operator starts the linear actuator 5, which retracts the stem 7 causing the arm 2 to rotate from the disengagement position to the operating position (FIG. 13).

In this operating position, the blade 4 is fitted between the tyre B and the rim C and the bead of the tyre B is moved away from the edge of the rim C.

Figure 14:
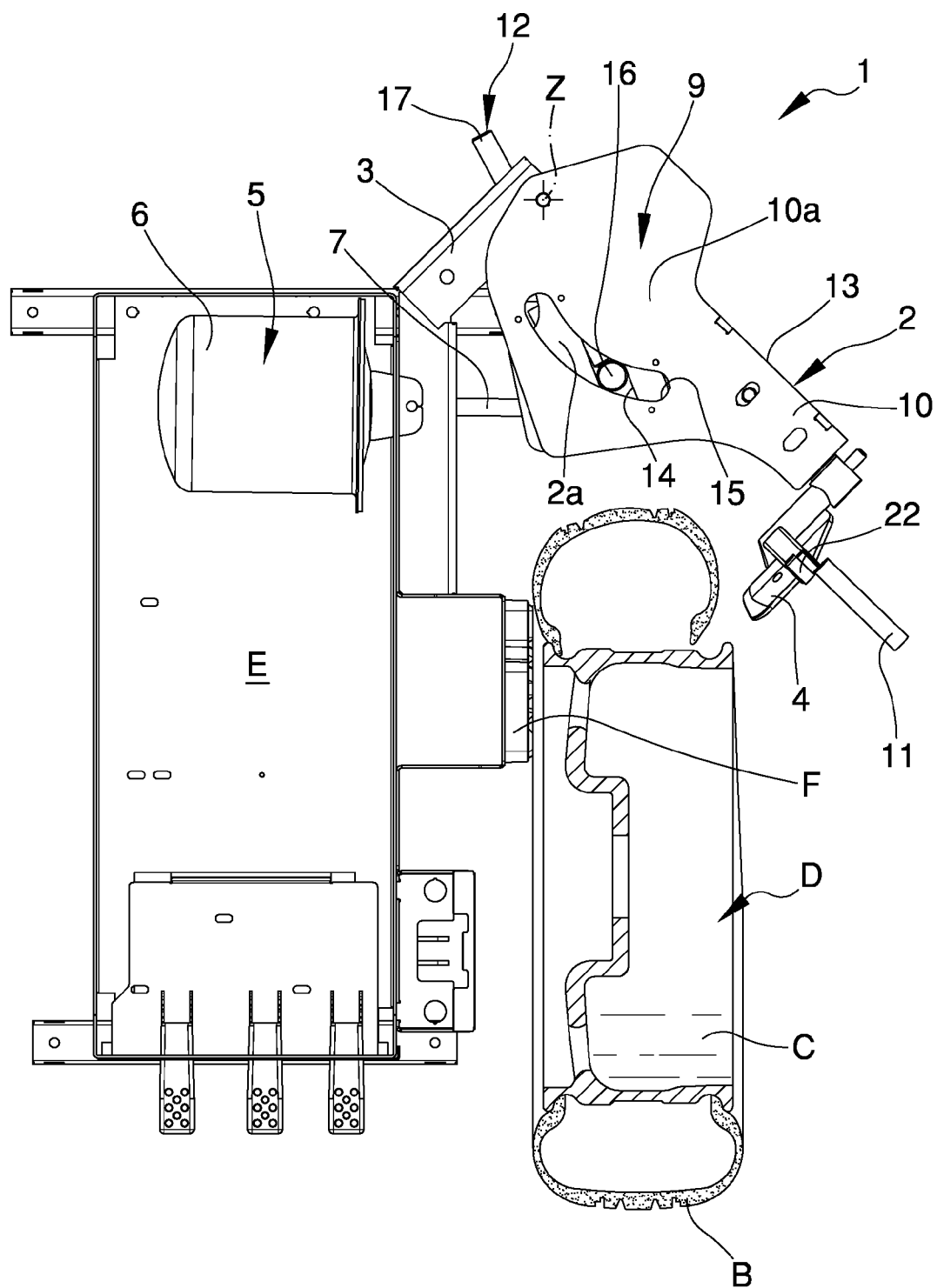

Subsequently, the linear actuator 5 returns the arm 2 to disengagement position and, therefore, extracts the blade 4 (FIG. 14).

In this position, the blade 4 is already in the proximity of the tyre, in an optimal position to perform the bead breaking of another section of the tyre B of the same wheel D or to perform the bead breaking of another wheel D with a tyre B of the same size.

The operation can be repeated in the same way for tyres of different sizes and type.

It has in fact been ascertained how the described invention achieves the intended objects.

In particular, the fact is underlined that the bead breaking unit according to the invention allows the optimum bead breaking of tyres of different types and sizes.

In particular, the adjustment apparatus for adjusting the position of the blade allows positioning the blade in the proximity of the section of the tyre to undergo bead breaking before the bead breaking operation.

This permits regulating the initial position of the blade for tyres of different width and therefore also maintaining the same stroke of the blade during bead breaking also for tyres of different sizes.

Consequently, this allows preventing any damage to the tyre due to an excessive insertion of the blade between the rim and the tyre.

The presence of the adjustment apparatus for adjusting the initial position of the blade, furthermore, allows simplifying the wheel positioning operation before bead breaking.

In fact, once the blade has been correctly positioned, it is simple for the operator to determine the correct position of the wheel before bead breaking.

The presence of the adjustment apparatus for adjusting the initial position of the bead breaking tool, furthermore, permits defining the exit stroke of the actuator stem in accordance with the width of the tyre.

This permits avoiding, as occurs in the state of the art, an exit stroke of the stem beyond the width of the tyre, which is excessive, pointless and onerous in terms of time.

The invention claimed is:

1. Bead breaking unit for tyre changing machines comprising at least one arm associated rotatable with a supporting structure at least a bead breaking tool associated with said arm and a movement apparatus associated with said arm and suitable for moving said arm from a disengagement position, wherein said bead breaking tool is substantially moved away from the tyre of a wheel to undergo bead breaking, to an operating position, wherein said bead breaking tool is engaged on said tyre wherein said arm comprises an adjustment apparatus for adjusting the position of said bead breaking tool along a near/away direction to/from said wheel said adjustment apparatus being suitable for adjusting the position of said bead breaking tool when said arm is in said disengagement position, depending on the sizes and/or type of said wheel.

2. Bead breaking unit as claimed in claim 1, wherein said adjustment comprises at least a supporting element of said bead breaking tool associated with said supporting structure and mobile with respect to said movement apparatus.

3. Bead breaking unit as claimed in claim 2, wherein said adjustment apparatus comprises a locking/release device for locking/releasing said supporting element with respect to said movement apparatus.

4. Bead breaking unit as claimed in claim 3, wherein said supporting element is associated rotatable with said supporting structure.

5. Bead breaking unit as claimed in claim 2, wherein said movement apparatus comprise at least a mobile element associated sliding with said supporting element and in that said locking/release device comprises a stop device of said supporting element with respect to said mobile element.

6. Bead breaking unit as claimed in claim 5, wherein said stop device comprises at least a braking element associated with said supporting element and suitable for braking the sliding of said mobile element with respect to said supporting element.

7. Bead breaking unit as claimed in claim 6, wherein said braking element comprises at least a hole for the transit of a section of said mobile element, said braking element being mobile between a sliding position, wherein said hole is coupled to said mobile element with play, and a locking position, wherein said hole is substantially inclined with respect to said mobile element and the walls of said hole are engaged on said mobile element.

8. Bead breaking unit as claimed in claim 7, wherein said locking/release device comprises at least an actuator for moving said braking element between said sliding position and said locking position.

9. Bead breaking unit as claimed in claim 3, wherein said arm comprises at least a connection element associated rotatable with said supporting structure and associated with said movement apparatus, said locking/release device being suitable for locking/releasing the movement of said supporting element with respect to said connection element.

10. Bead breaking unit as claimed in claim 9, wherein said locking/release device comprises:
   at least a first slot obtained on said connection element;
   at least a second slot obtained on said supporting element;
   at least a locking pin engaged sliding inside said first slot and said second slot;
   a stop device of said locking pin with respect to at least one between said first slot and said second slot.

11. Bead breaking unit as claimed in claim 10, wherein said first slot and said second slot are partially superimposed and extend along directions substantially transversal the one to the other.

12. Bead breaking unit as claimed in claim 10, wherein said stop comprises at least a rod or the like associated integral with said locking pin and associated axially sliding with at least one between said connection element and said supporting element.

13. Bead breaking unit as claimed in claim 12, wherein said stop device comprises at least a braking element associated with at least one between said connection element and said supporting element suitable for braking the sliding of said rod.

14. Bead breaking unit as claimed in claim 13, wherein said braking element comprises at least a hole for the transit of a section of said rod, said braking element being mobile between a sliding position, wherein said hole is coupled to said rod with play, and a locking position, wherein said hole is substantially inclined with respect to said rod and the walls of said hole are engaged on said rod.

15. Bead breaking unit as claimed in claim 14, wherein said stop device comprises at least an actuator for moving said braking element between said sliding position and said locking position.

16. Bead breaking unit as claimed in claim 9, wherein said connection element comprises at least a first plate having said first slot.

17. Bead breaking unit as claimed in claim 16, wherein said supporting element comprises at least a second plate having said second slot.

18. Bead breaking unit as claimed in claim 1, comprising a variation device for varying the stroke of said arm between said disengagement position and said operating position.

* * * * *